United States Patent
Fujita et al.

(10) Patent No.: US 11,159,685 B2
(45) Date of Patent: Oct. 26, 2021

(54) DISPLAY CONTROL DEVICE, DISPLAY CONTROL METHOD, AND STORAGE MEDIUM

(71) Applicant: KYOCERA Document Solutions Inc., Osaka (JP)

(72) Inventors: Nobuto Fujita, Osaka (JP); Kenji Kiyose, Osaka (JP); Sumio Yamada, Osaka (JP); Takayuki Mashimo, Osaka (JP); Ryota Seike, Osaka (JP); Koji Kuroda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/833,100

(22) Filed: Mar. 27, 2020

(65) Prior Publication Data
US 2020/0314267 A1    Oct. 1, 2020

(30) Foreign Application Priority Data

Mar. 29, 2019  (JP) .............................. JP2019-068398

(51) Int. Cl.
*H04N 1/00* (2006.01)
*G06F 3/16* (2006.01)
*G10L 15/22* (2006.01)

(52) U.S. Cl.
CPC ......... *H04N 1/00411* (2013.01); *G06F 3/167* (2013.01); *G10L 15/22* (2013.01); *H04N 1/00469* (2013.01)

(58) Field of Classification Search
CPC ............ H04N 1/00411; H04N 1/00469; G06F 3/167; G10L 15/22

USPC ......................................................... 358/1.15
See application file for complete search history.

(56) References Cited

U.S. PATENT DOCUMENTS

| | | | | |
|---|---|---|---|---|
| 5,864,808 A | * | 1/1999 | Ando | G06K 9/033 704/251 |
| 2010/0141681 A1 | * | 6/2010 | Fujii | H04N 1/00514 345/649 |
| 2010/0290083 A1 | | 11/2010 | Nakagawa | |
| 2014/0180698 A1 | * | 6/2014 | Kai | G10L 15/22 704/275 |
| 2017/0270086 A1 | * | 9/2017 | Fume | G06F 3/0488 |
| 2017/0372695 A1 | * | 12/2017 | Takei | G10L 15/187 |
| 2018/0174580 A1 | * | 6/2018 | Kim | G10L 15/197 |
| 2019/0079709 A1 | * | 3/2019 | Tokuchi | G06F 3/1231 |
| 2019/0244612 A1 | * | 8/2019 | Han | G10L 15/02 |

FOREIGN PATENT DOCUMENTS

JP     2010-267054 A     11/2010

* cited by examiner

*Primary Examiner* — Allen H Nguyen
(74) *Attorney, Agent, or Firm* — Studebaker & Brackett PC

(57) ABSTRACT

A display control device includes a display section, a first receiving section, a second receiving section, and a performing section. The display section displays an object. The first receiving section receives non-voice input specifying a first operation on the object. The second receiving section receives voice input specifying a second operation on the object. The performing section performs, on the object, a complex operation specified by the non-voice input and the voice input.

11 Claims, 12 Drawing Sheets

DISPLAY CONTROL DEVICE, DISPLAY CONTROL METHOD, AND STORAGE MEDIUM

INCORPORATION BY REFERENCE

The present application claims priority under 35 U.S.C. § 119 to Japanese Patent Application No. 2019-068398, filed on Mar. 29, 2019. The contents of this application are incorporated herein by reference in their entirety.

BACKGROUND

The present disclosure relates to a display control device, a display control method, and a storage medium.

According to a certain information processing device, an application transmits meaning such as a cover, back cover, or appendix held by a page to a print driver. Therewith, printed matter of a print range intended by a user is output even when the user does not specify a print range when printing, such as from the first page to the second page.

SUMMARY

A display control device according to an aspect of the present disclosure includes a display section, a first receiving section, a second receiving section, and a performing section. The display section displays an object. The first receiving section receives non-voice input specifying a first operation on the object. The second receiving section receives voice input specifying a second operation on the object. The performing section performs, on the object, a complex operation specified by the non-voice input and the voice input.

A display control method according to an aspect of the present disclosure includes: displaying an object on a display section; receiving non-voice input specifying a first operation on the object; receiving voice input specifying a second operation on the object; and performing, on the object, a complex operation specified by the non-voice input and the voice input.

A storage medium according to an aspect of the present disclosure is a non-temporary computer-readable storage medium. The storage medium stores a display control program for causing a computer to function as a first receiving section, a second receiving section, and a performing section. The first receiving section receives non-voice input specifying a first operation on an object. The second receiving section receives voice input specifying a second operation on the object. The performing section performs, on the object, a complex operation specified by the non-voice input and the voice input.

DETAILED DESCRIPTION

Figure 1:
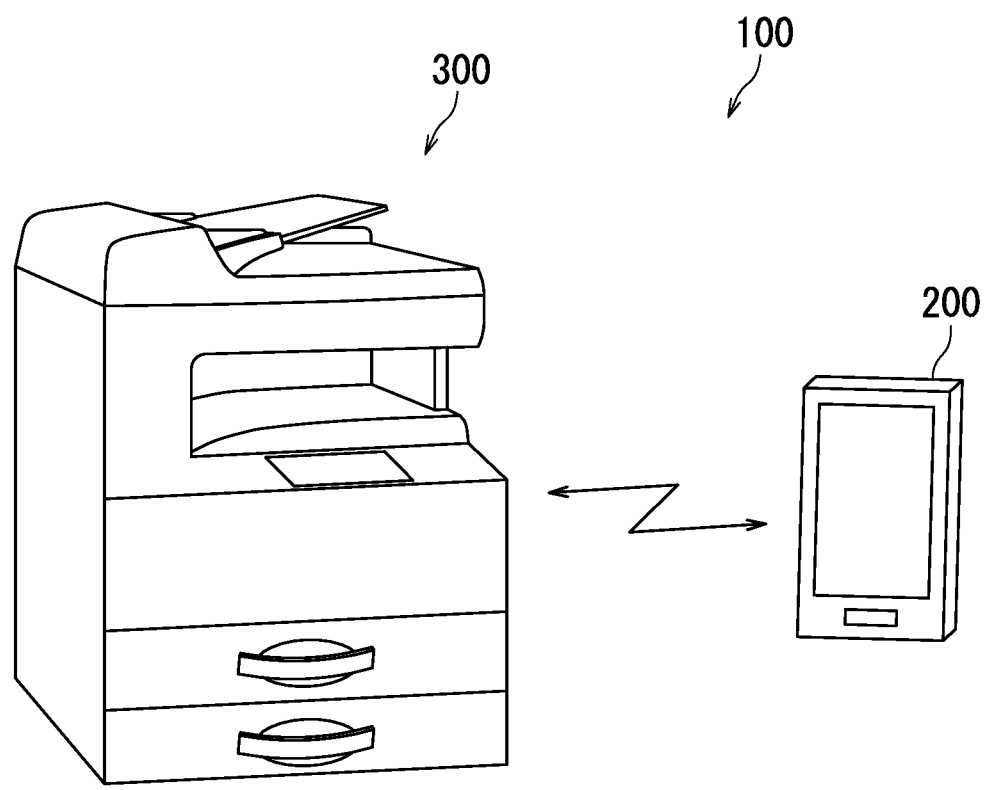
FIG. 1 is a perspective view of a configuration of an image forming system including a display control device according to an embodiment of the present disclosure.

The following describes a display control device, a display control method, and a storage medium according to an embodiment of the present disclosure with reference to the accompanying drawings. Elements that are the same or equivalent are labeled with the same reference signs in the drawings and description thereof is not repeated.

First, a configuration of an image forming system 100 including the display control device according to the embodiment is described with reference to FIG. 1. FIG. 1 is a perspective view of the configuration of the image forming system 100.

As illustrated in FIG. 1, the image forming system 100 includes a mobile terminal 200 and an image forming apparatus 300. The mobile terminal 200 and the image forming apparatus 300 are communicatively connected to each other. The mobile terminal 200 sends a print command to the image forming apparatus 300. The mobile terminal 200 is configured as a smartphone or a tablet terminal, for example. The image forming apparatus 300 is configured as a multifunction peripheral, for example. The mobile terminal 200 is equivalent to an example of a "display control device".

Figure 2:
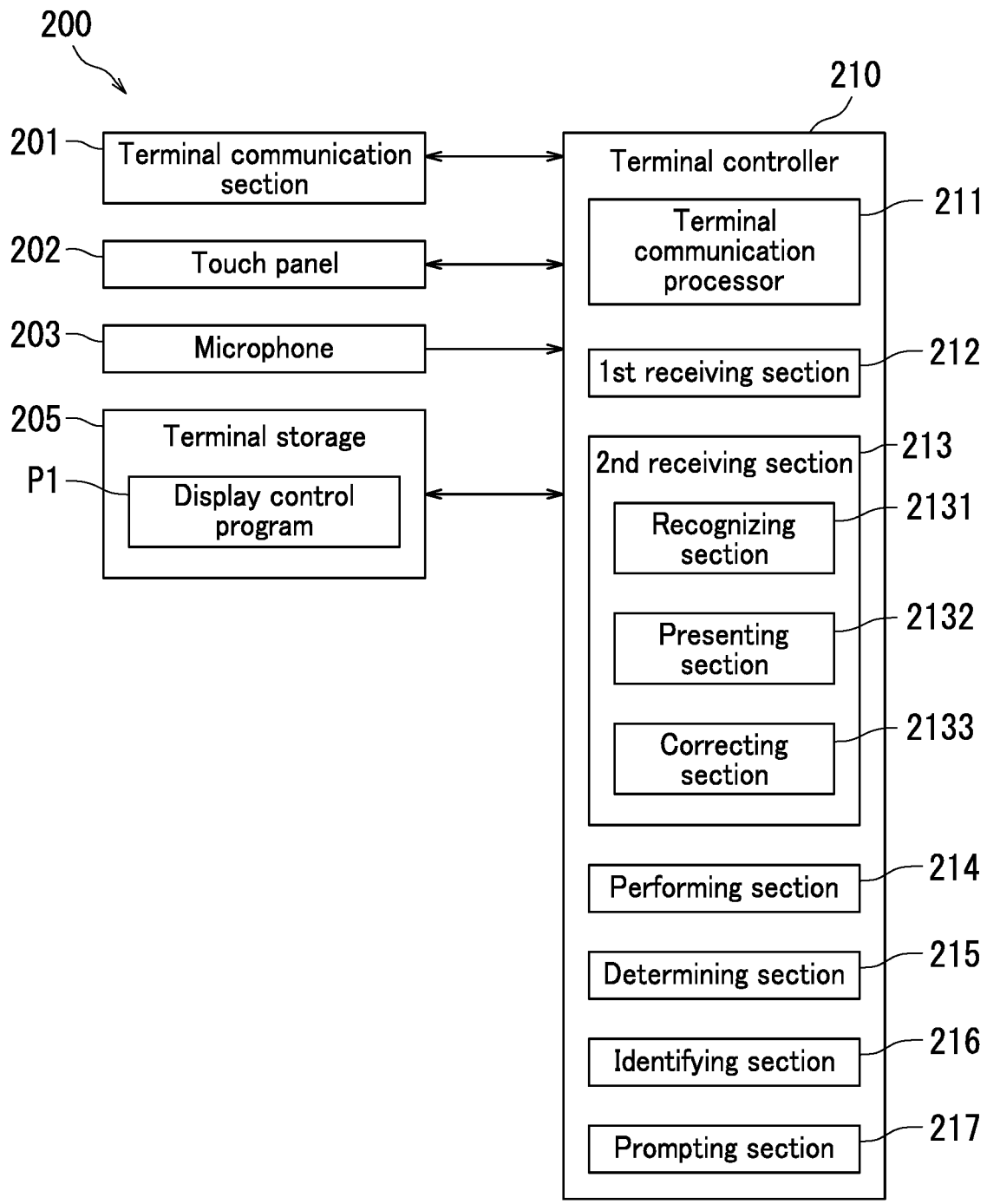
FIG. 2 is a block diagram illustrating an example of a configuration of a mobile terminal.

Next, a configuration of the mobile terminal 200 is described with reference to FIG. 2. FIG. 2 is a block diagram illustrating an example of the configuration of the mobile terminal 200.

As illustrated in FIG. 2, the mobile terminal 200 includes a terminal communication section 201, a touch panel 202, a microphone 203, terminal storage 205, and a terminal controller 210.

The terminal communication section 201 is a wireless communication interface. The mobile terminal 200 is capable of communication with an electronic device equipped with a wireless communication interface of the same type as the terminal communication section 201.

The touch panel 202 displays various information according to control by the terminal controller 210. The various information includes one or more objects. The touch panel 202 transmits non-voice input to the terminal controller 210 according to a touch operation by a user. The touch panel 202 is equivalent to an example of a "display section".

The microphone 203 transmits voice input by the user to the terminal controller 210.

The terminal storage 205 includes memory such as read-only memory (ROM), random-access memory (RAM), and a hard disk drive (HDD). A display control program P1 is stored in the ROM.

The terminal controller 210 includes a terminal communication processor 211, a first receiving section 212, a second receiving section 213, a performing section 214, a determining section 215, an identifying section 216, and a prompting section 217, and controls operation of each element of the mobile terminal 200. The terminal controller 210 functions as the terminal communication processor 211, the first receiving section 212, the second receiving section 213, the performing section 214, the determining section 215, the identifying section 216, and the prompting section 217 by executing the display control program P1.

The terminal communication processor 211 controls communication by the terminal communication section 201. The terminal communication processor 211 sends a print command to the image forming apparatus 300 through the terminal communication section 201.

The first receiving section 212 receives non-voice input specifying a first operation on an object displayed on the touch panel 202. For example, the first receiving section 212 receives non-voice input of an operation in which the user selects a portion of an object on the touch panel 202 as the first operation.

The second receiving section 213 receives voice input specifying a second operation on an object displayed on the touch panel 202. For example, the second receiving section 213 receives voice input of an operation in which an object is enlarged and displayed on the touch panel 202 as the second operation. The second receiving section 213 also receives voice input of an operation in which an object is rotated and displayed on the touch panel 202 as the second operation.

To describe in detail, the second receiving section 213 includes a recognizing section 2131, a presenting section 2132, and a correcting section 2133. The recognizing section 2131 performs speech recognition related to the content of the second operation. The presenting section 2132 presents the result of the speech recognition on the touch panel 202. The correcting section 2133 corrects the result of the speech recognition according to a correction instruction.

The performing section 214 performs, on an object displayed on the touch panel 202, a complex operation specified through non-voice input and voice input.

The determining section 215 determines a first range R1 indicating a range of operation allowed to be specified as the first operation and a second range R2 indicating a range of operation allowed to be specified as the second operation. The first receiving section 212 receives only non-voice input specifying an operation belonging to the first range R1. The second receiving section 213 receives only voice input specifying an operation belonging to the second range R2. The determining section 215 further has a function of determining which of the first receiving section 212 and the second receiving section 213 has priority for an operation belonging to both of the first range R1 and the second range R2.

The touch panel 202 can display a first object and a second object. The first object and the second object differ from each other. The first receiving section 212 receives first non-voice input specifying a third operation on the first object and second non-voice input specifying a fourth operation on the second object. The second receiving section 213 receives first voice input specifying a fifth operation on the first object and the second object. The performing section 214 performs a first complex operation on the first object and the second object. The first complex operation is specified by the first non-voice input, the second non-voice input, and the first voice input.

The identifying section 216 displays, on the touch panel 202, a first identifier for identifying the first object and a second identifier for identifying the second object. The first identifier and the second identifier are for example colors, shapes, or a combination thereof.

The first receiving section 212, for example, receives the first non-voice input of an operation in which the user selects a portion of the first object on the touch panel 202 with a finger as the third operation. The first receiving section 212 also receives the second non-voice input of an operation in which the user selects a portion of the second object on the touch panel 202 with a finger as the fourth operation.

The second receiving section 213, for example, receives the first voice input of an operation in which the first object and the second object are enlarged, aggregated, and displayed on the touch panel 202 as the fifth operation.

The prompting section 217 prompts the first non-voice input specifying the third operation and the second non-voice input specifying the fourth operation when the second receiving section 213 receives the first voice input specifying the fifth operation before the first receiving section 212 receives the first non-voice input and the second non-voice input.

Figure 3:
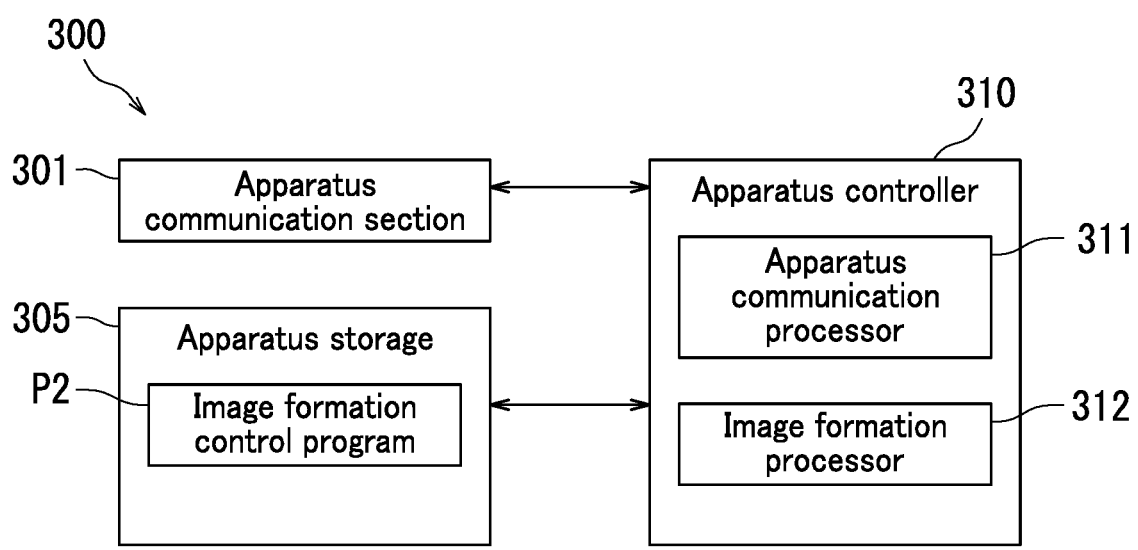
FIG. 3 is a block diagram illustrating an example of a configuration of an image forming apparatus.

Next, a configuration of the image forming apparatus 300 is described with reference to FIG. 3. FIG. 3 is a block diagram illustrating an example of the configuration of the image forming apparatus 300.

As illustrated in FIG. 3, the image forming apparatus 300 includes an apparatus communication section 301, apparatus storage 305, and an apparatus controller 310.

The apparatus communication section 301 is a wireless communication interface of the same type as the terminal communication section 201. The image forming apparatus 300 can communicate with the mobile terminal 200.

The apparatus storage 305 includes ROM, RAM, an HDD, and the like. An image formation control program P2 is stored in the ROM.

The apparatus controller 310 includes an apparatus communication processor 311 and an image formation processor 312, and controls operation of each element of the image forming apparatus 300. The apparatus controller 310 functions as the apparatus communication processor 311 and the image formation processor 312 by executing the image formation control program P2.

The apparatus communication processor 311 controls communication performed by the apparatus communication section 301. The apparatus communication processor 311 transmits a print command received from the mobile terminal 200 through the apparatus communication section 301 to the image formation processor 312.

The image formation processor 312 controls an unillustrated image forming section of the image forming apparatus 300 such that image formation is performed according to the print command.

Figure 4:
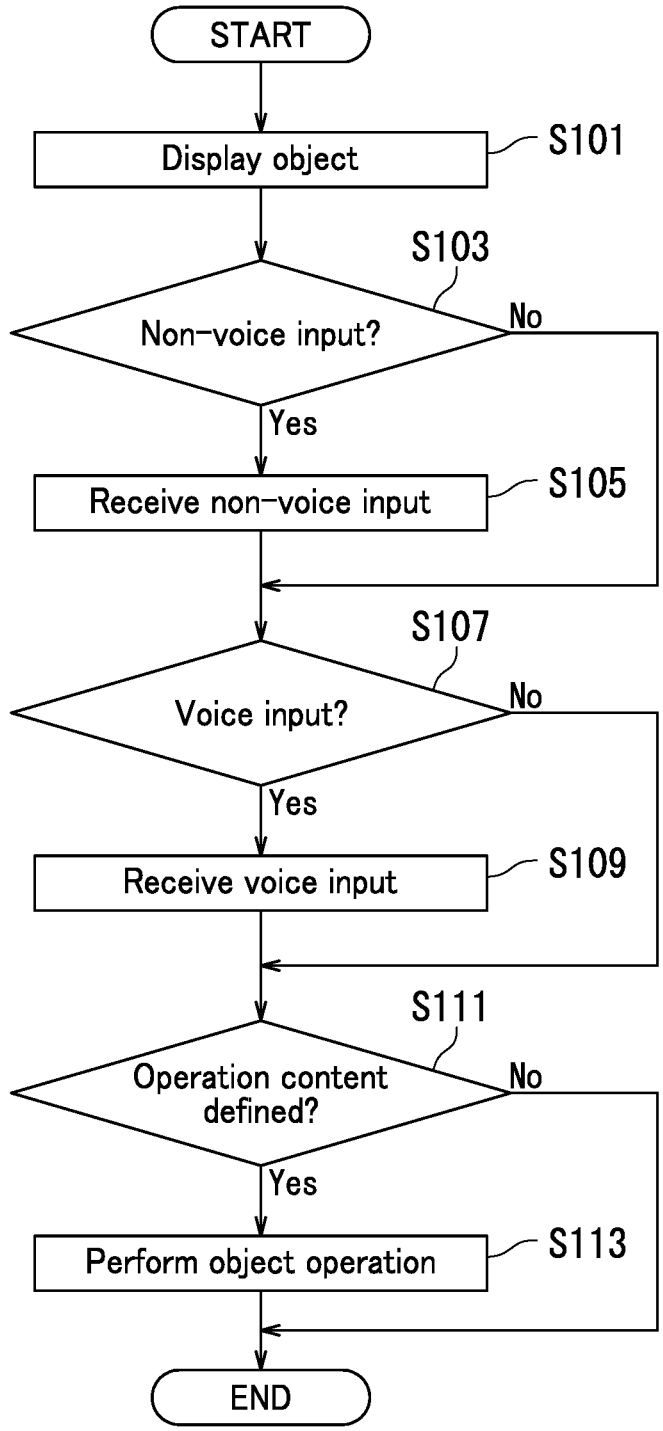
FIG. 4 is a flowchart depicting an example of operation of the mobile terminal.

Next, operation of the mobile terminal 200 is described with reference to FIGS. 1 to 4. FIG. 4 is a flowchart depicting an example of the operation of the mobile terminal 200.

Step S101: As depicted in FIG. 4, the terminal controller 210 controls the touch panel 202 such that one or more objects are displayed on the touch panel 202. The process of the terminal controller 210 advances to Step S103.

Step S103: The terminal controller 210 determines whether or not there is non-voice input specifying the first operation from the user on an object. When there is non-voice input (Yes in Step S103), the process of the terminal controller 210 advances to Step S105. When there is no non-voice input (No in Step S103), the process of the terminal controller 210 advances to Step S107.

Step S105: The first receiving section 212 receives non-voice input. The process of the terminal controller 210 advances to Step S107.

Step S107: The terminal controller 210 determines whether or not there is voice input specifying the second operation from the user on an object. When there is voice input (Yes in Step S107), the process of the terminal controller 210 advances to Step S109. When there is no voice input (No in Step S107), the process of the terminal controller 210 advances to Step S111.

Step S109: The second receiving section 213 receives voice input. The process of the terminal controller 210 advances to Step S111.

Step S111: The terminal controller 210 determines whether or not content of the operation by the user has been defined by combining non-voice input and voice input. When the content of the operation has been defined (Yes in Step S111), the process of the terminal controller 210 advances to Step S113. When the content of the operation has not been defined (No in Step S111), the terminal controller 210 ends the process.

Step S113: The performing section 214 performs a complex operation specified by the non-voice input and the voice input on the object. The terminal controller 210 then ends the process.

Figure 5A:
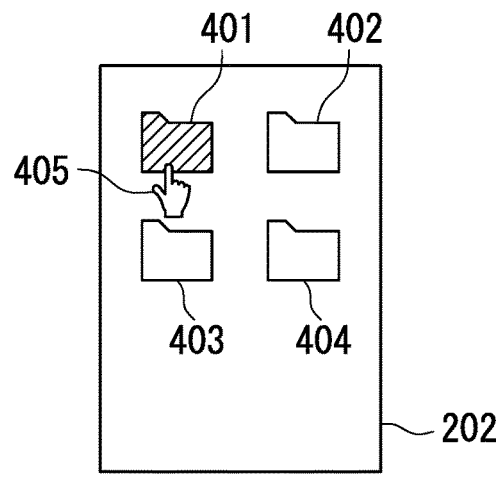
FIGS. 5A, 5B, and 5C are diagrams illustrating screens of a touch panel during a series of operations on the mobile terminal.
Figure 5B:
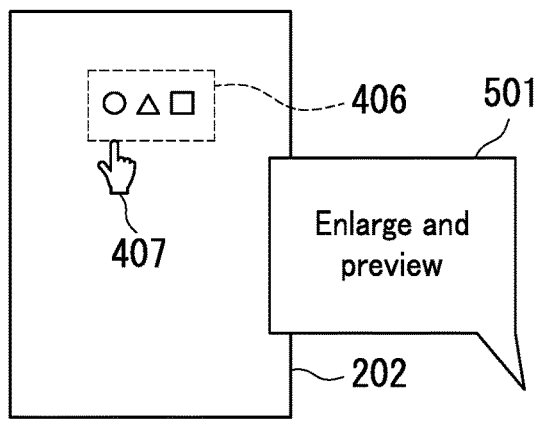
Figure 5C:
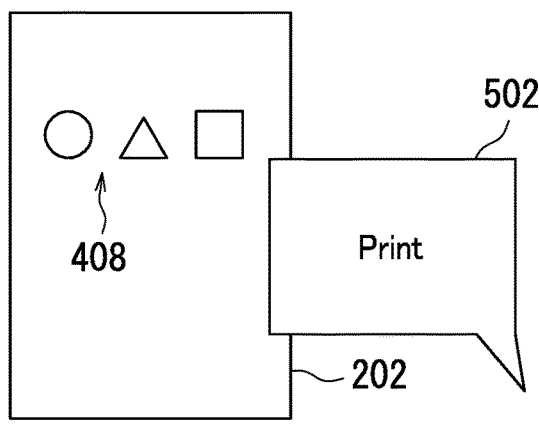

Next, an example of the operation of the mobile terminal 200 is described with reference to FIGS. 1 to 4, 5A, 5B, and 5C. FIGS. 5A, 5B, and 5C are diagrams illustrating screens of the touch panel 202 during a series of operations on the mobile terminal 200.

As illustrated in FIG. 5A, the touch panel 202 is displaying a first document file icon 401, a second document file icon 402, a third document file icon 403, and a fourth document file icon 404. The user, for example, selects a first document file by touching the first document file icon 401 with a finger. The user can confirm that the first document file has been selected as the first object through the color of the first document file icon 401 changing to yellow and a finger icon 405 being displayed adjacent to the first document file icon 401.

Next, as illustrated in FIG. 5B, the user selects a specific range 406 within one page of the first document file displayed on the touch panel 202 through a touch operation using a thumb and an index finger. The user can confirm that the range 406 has been selected through a finger icon 407 being displayed adjacent to a yellow frame indicating the range 406. Furthermore, the user gives voice input 501 of "enlarge and preview" to the mobile terminal 200.

Next, as illustrated in FIG. 5C, the user gives voice input 502 of "print" to the mobile terminal 200 upon confirming an enlarged preview 408 displayed on the touch panel 202. As a result, a print command desired by the user is sent to the image forming apparatus 300. An image confirmed as the enlarged preview 408 is printed by the image forming apparatus 300. It should be noted that the user may give voice input 502 of "enlarge to A4 and print" to the mobile terminal 200 as a print instruction together with a print setting which includes paper size setting.

Figure 6A:
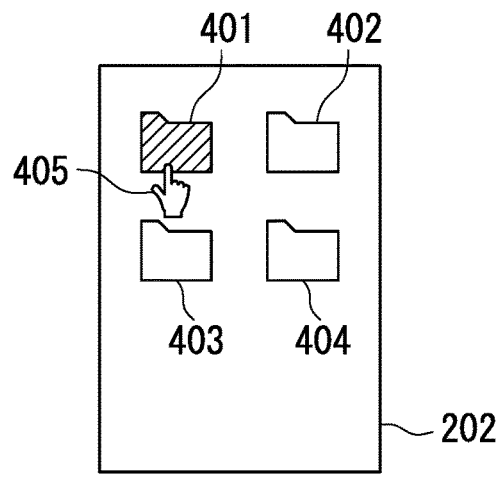
FIGS. 6A, 6B, and 6C are diagrams illustrating screens of the touch panel during another series of operations on the mobile terminal.
Figure 6B:
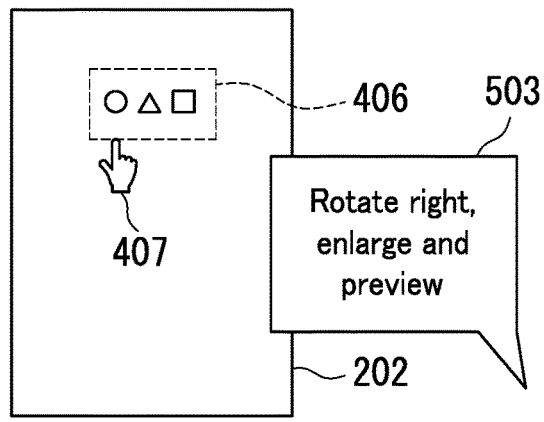
Figure 6C:
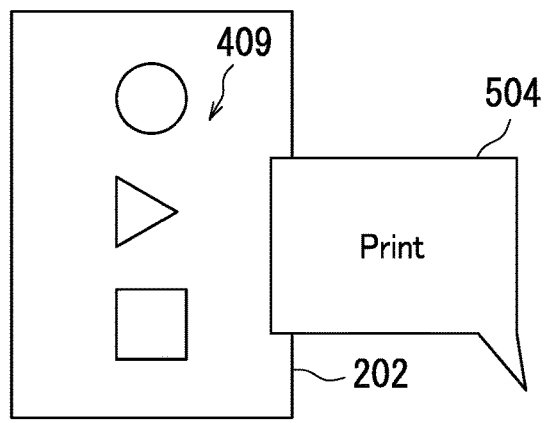

Next, another example of the operation of the mobile terminal 200 is described with reference to FIGS. 1 to 4, 6A, 6B, and 6C. FIGS. 6A, 6B, and 6C are diagrams illustrating screens of the touch panel 202 during another series of operations on the mobile terminal 200.

As illustrated in FIG. 6A, the touch panel 202 is displaying the first document file icon 401, the second document file icon 402, the third document file icon 403, and the fourth document file icon 404. The user, for example, selects the first document file by tapping the first document file icon 401 with a finger. The user can confirm that the first document file has been selected as the first object through the color of the first document file icon 401 changing to yellow and the finger icon 405 being displayed adjacent to the first document file icon 401.

Next, as illustrated in FIG. 6B, the user selects the specific range 406 within one page of the first document file displayed on the touch panel 202 through a touch operation using a thumb and an index finger. The user can confirm that the range 406 has been selected through the finger icon 407 being displayed adjacent to the yellow frame indicating the range 406. Furthermore, the user gives voice input 503 of "rotate right, enlarge, and preview" to the mobile terminal 200.

Next, as illustrated in FIG. 6C, the user gives voice input 504 of "print" to the mobile terminal 200 upon confirming an enlarged preview 409 displayed on the touch panel 202. As a result, a print command desired by the user is sent to the image forming apparatus 300. An image confirmed as the enlarged preview 409 is printed by the image forming apparatus 300.

Figure 7A:
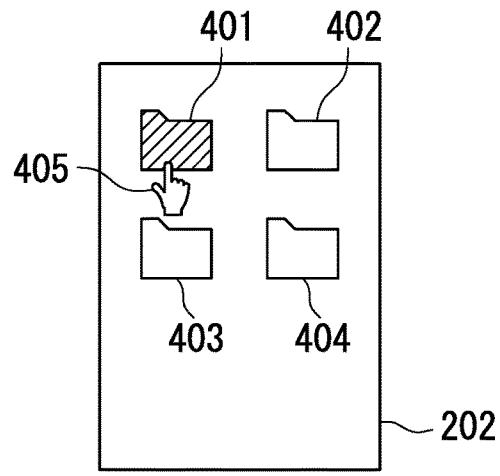
FIGS. 7A, 7B, and 7C are diagrams illustrating screens of the touch panel during yet another series of operations on the mobile terminal.
Figure 7B:
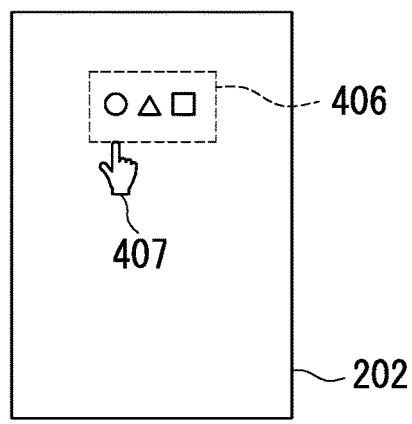
Figure 7C:
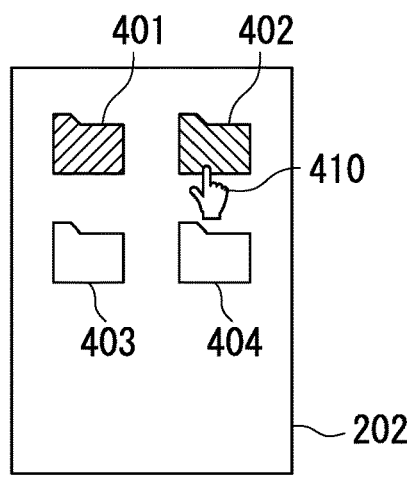
Figure 8A:
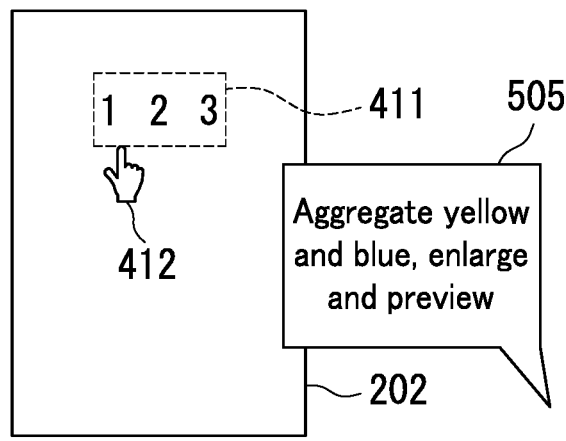
FIGS. 8A and 8B are diagrams illustrating screens of the touch panel during a series of operations continued from FIG. 7C.
Figure 8B:
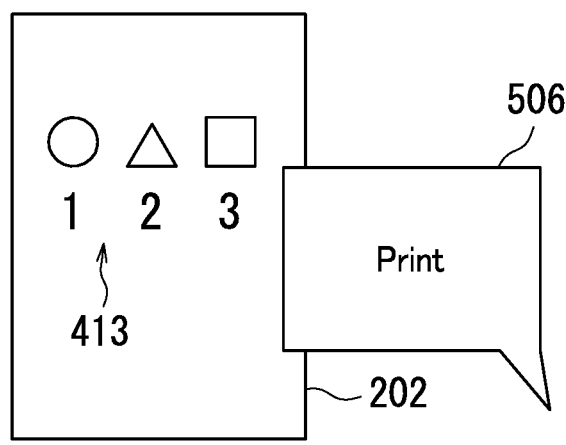

Next, yet another example of the operation of the mobile terminal 200 is described with reference to FIGS. 1 to 4, 7A, 7B, 7C, 8A, and 8B. FIGS. 7A, 7B, and 7C are diagrams illustrating screens of the touch panel 202 during yet another series of operations on the mobile terminal 200. FIGS. 8A and 8B are diagrams illustrating screens of the touch panel 202 during a series of operations continued from FIG. 7C.

As illustrated in FIG. 7A, the touch panel 202 is displaying the first document file icon 401, the second document file icon 402, the third document file icon 403, and the fourth document file icon 404. The user, for example, selects the first document file by tapping the first document file icon 401 with a finger. The user can confirm that the first document file has been selected as the first object through the color of the first document file icon 401 changing to yellow and the finger icon 405 being displayed adjacent to the first document file icon 401.

Next, as illustrated in FIG. 7B, the user selects the specific range 406 within one page of the first document file displayed on the touch panel 202 with a touch operation using a thumb and an index finger. The user can confirm that the range 406 has been selected through the finger icon 407 being displayed adjacent to a yellow frame indicating the range 406.

Next, as illustrated in FIG. 7C, the user for example selects a second document file by tapping the second document file icon 402 with a finger. The user can confirm that the second document file has been selected as the second object through the color of the second document file icon 402 changing to blue and a finger icon 410 being displayed adjacent to the second document file icon 402.

Next, as illustrated in FIG. 8A, the user selects a specific range 411 within one page of the second document file displayed on the touch panel 202 with a touch operation of a thumb and an index finger. The user can confirm that the range 411 has been selected through a finger icon 412 being displayed adjacent to a blue frame indicating the range 411. Furthermore, the user gives voice input 505 of "aggregate yellow and blue, enlarge and preview" to the mobile terminal 200.

Next, as illustrated in FIG. 8B, the user gives voice input 506 of "print" to the mobile terminal 200 upon confirming an aggregated and enlarged preview 413 displayed on the touch panel 202. As a result, a print command desired by the user is sent to the image forming apparatus 300. An image confirmed through the aggregated and enlarged preview 413 is printed by the image forming apparatus 300.

Figure 9A:
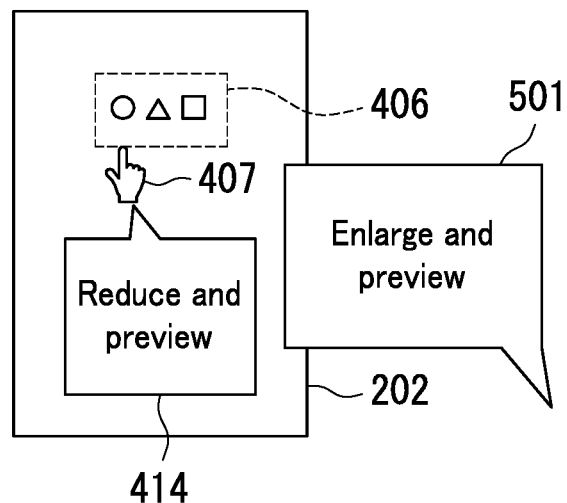
FIGS. 9A and 9B are diagrams illustrating screens of the touch panel during a process of correcting a result of speech recognition.
Figure 9B:
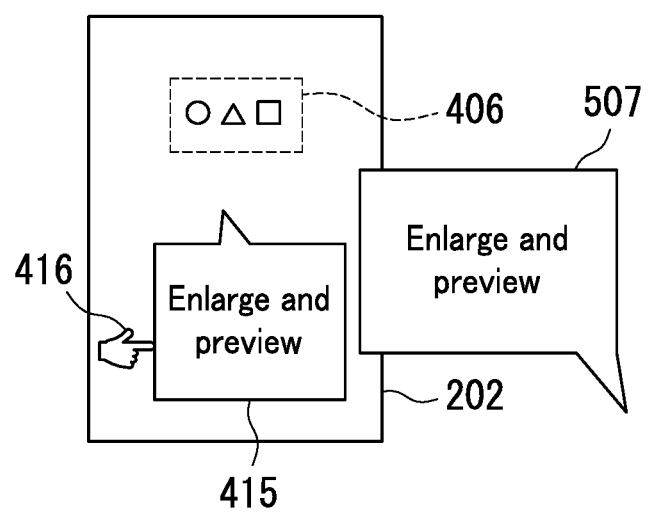

Next, a process of correcting a result of speech recognition is described with reference to FIGS. 1 to 4, 9A, and 9B. FIGS. 9A and 9B are diagrams illustrating screens of the touch panel 202 during the process of correcting a result of speech recognition.

As illustrated in FIG. 9A, the user gives the voice input 501 of "enlarge and preview" to the mobile terminal 200 upon confirming that the range 406 has been selected through the finger icon 407 being displayed adjacent to the yellow frame indicating the range 406. In FIG. 9A, "enlarge and preview" has been misrecognized as "reduce and preview". When the presenting section 2132 is set to an active state, a character string 414 expressing the result of speech recognition is presented adjacent to the finger icon 407.

The user who has noticed the misrecognition switches the mobile terminal 200 to a correction instruction input mode by tapping the character string 414. As illustrated in FIG. 9B, the user can confirm that the mobile terminal 200 has been switched to the correction instruction input mode through a finger icon 416 being displayed adjacent to a frame surrounding the character string 414. Furthermore, the user gives repeated voice input 507 of "enlarge and preview" to the mobile terminal 200. A character string 415 expressing the result of correct speech recognition is presented adjacent to the finger icon 416. It should be noted that the user may select key input instead of giving the repeated voice input 507.

Figure 10A:
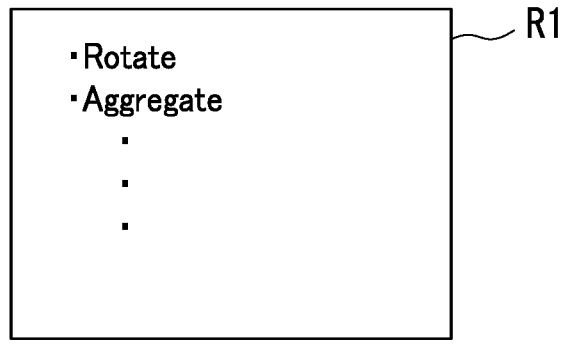
FIG. 10A is a diagram illustrating a first range indicating a range of operation in which non-voice input is allowed.
Figure 10B:
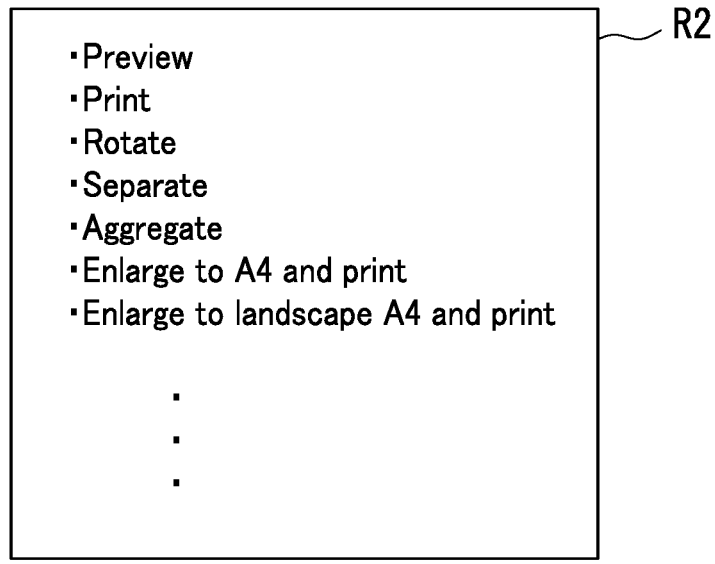
FIG. 10B is a diagram illustrating a second range indicating a range of operation in which voice input is allowed.

Next, contention between non-voice input and voice input is described with reference to FIGS. 1 to 4, 10A, and 10B. FIG. 10A is a diagram of the first range R1 indicating a range of operation in which non-voice input is allowed. FIG. 10B is a diagram of the second range R2 indicating a range of operation in which voice input is allowed.

As illustrated in FIG. 10A, the first range R1 includes object operations specified to the touch panel 202 by non-voice input, such as "rotate" and "aggregate". For example, "rotate" may be specified through a gesture operation by multiple fingers. As illustrated in FIG. 10B, the second range R2 includes object operations specified to the microphone 203 by voice input, such as "preview", "print", "rotate", "separate", "aggregate", "enlarge to A4 and print", and "enlarge to landscape A4 and print". Lists of the first range R1 and the second range R2 are stored in the terminal storage 205.

"Rotate" is an example of an object operation belonging to both of the first range R1 and the second range R2. The determining section 215 determines whether non-voice input or voice input has priority for an object operation belonging to both of the first range R1 and the second range R2.

Figure 11A:
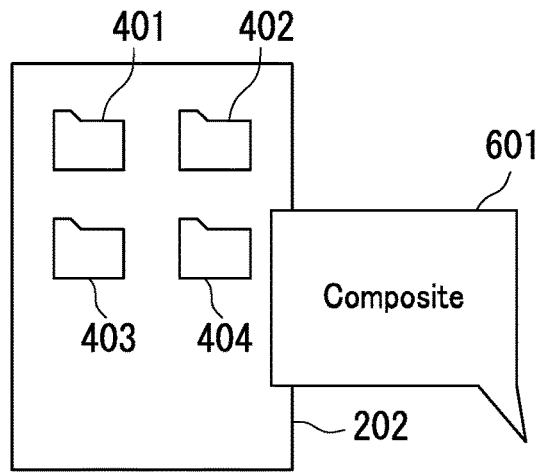
FIGS. 11A, 11B, and 11C are diagrams illustrating screens of the touch panel during yet another series of operations on the mobile terminal.
Figure 11B:
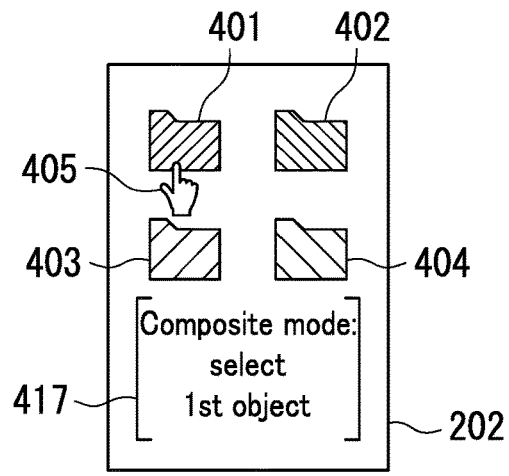
Figure 11C:
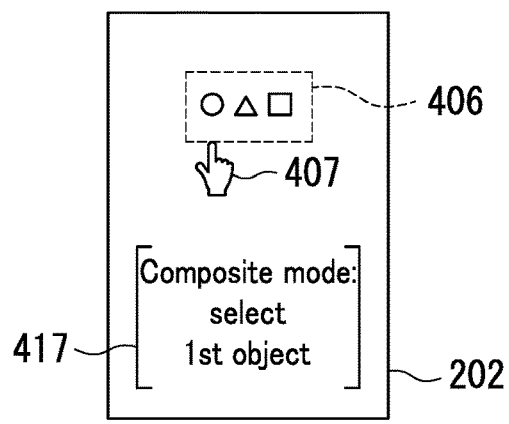
Figure 12A:
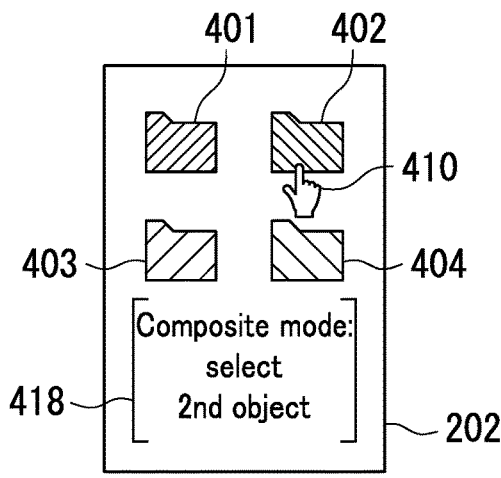
FIGS. 12A, 12B, and 12C are diagrams illustrating screens of the touch panel during a series of operations continued from FIG. 11C.
Figure 12B:
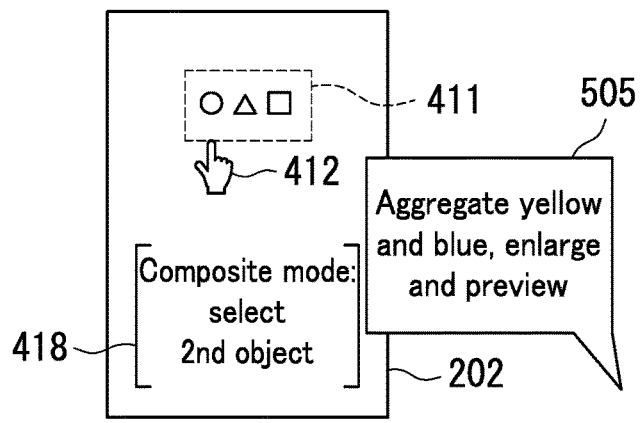
Figure 12C:
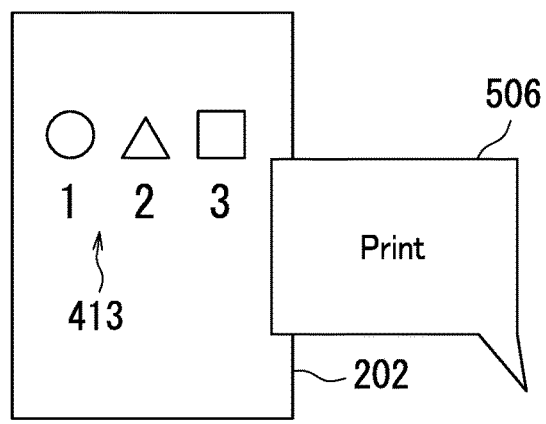

Next, yet another example of the operation of the mobile terminal 200 is described with reference to FIGS. 1 to 4, 11A, 11B, 11C, 12A, 12B, and 12C. FIGS. 11A, 11B, and 11C are diagrams illustrating screens of the touch panel 202 during yet another series of operations on the mobile terminal 200. FIGS. 12A, 12B, and 12C are diagrams illustrating screens of the touch panel 202 during a series of operations continued from FIG. 11C.

As illustrated in FIG. 11A, the touch panel 202 is displaying the first document file icon 401, the second document file icon 402, the third document file icon 403, and the fourth document file icon 404. The user gives voice input 601 of "composite" to the mobile terminal 200 so that the mobile terminal 200 switches to a composite mode.

As illustrated in FIG. 11B, the touch panel 202 changes the color of the first document file icon 401 to yellow and the color of the second document file icon 402 to blue. The touch panel 202 also changes the color of the third document file icon 403 to red and the color of the fourth document file icon 404 to green. The touch panel 202 further displays a character string 417 of "composite mode: select first object" so as to prompt a selection operation by the user. The user, for example, selects the first document file by tapping the first document file icon 401 with a finger. The user can confirm that the first document file has been selected as the first object through the finger icon 405 being displayed adjacent to the first document file icon 401.

Next, as illustrated in FIG. 11C, the user selects the specific range 406 within one page of the first document file displayed on the touch panel 202 with a touch operation using a thumb and an index finger. The user can confirm that the range 406 has been selected through the finger icon 407 being displayed adjacent to a yellow frame indicating the range 406.

Next, as illustrated in FIG. 12A, the touch panel 202 displays the first document file icon 401, the second document file icon 402, the third document file icon 403, and the fourth document file icon 404 again in the respective colors. The touch panel 202 further displays a character string 418 of "composite mode: select second object" so as to prompt the next selection operation by the user. The user, for example, selects the second document file by tapping the second document file icon 402 with a finger. The user can confirm that the second document file has been selected as the second object through the finger icon 410 being displayed adjacent to the second document file icon 402.

Next, as illustrated in FIG. 12B, the user selects the specific range 411 within one page of the second document file displayed on the touch panel 202 with a touch operation using a thumb and index finger. The user can confirm that the range 411 has been selected through the finger icon 412 being displayed adjacent to a blue frame indicating the range 411. The user further gives the voice input 505 of "aggregate yellow and blue, enlarge and preview" to the mobile terminal 200.

Next, as illustrated in FIG. 12C, the user gives the voice input 506 of "print" to the mobile terminal 200 upon confirming an aggregated and enlarged preview 413 displayed on the touch panel 202. As a result, a print command desired by the user is sent to the image forming apparatus 300. An image confirmed through the aggregated and enlarged preview 413 is printed by the image forming apparatus 300.

According to the mobile terminal 200 as described above, the user can perform a print instruction and a print setting such as selection of print range and selection of paper size at the same time by combining non-voice input and voice input. Accordingly, convenience for the user increases.

An embodiment of the present disclosure is described above with reference to the accompanying drawings. However, the present disclosure is not limited by the above embodiment and may be implemented in various manners within a scope not departing from the gist thereof.

For example, in the embodiment of the present disclosure, the display control device is the mobile terminal 200 which is configured as a smartphone or a tablet terminal. However, the present disclosure is not limited as such. For example, the display control device may be an electronic device such as the image forming apparatus 300 or a personal computer to which the display control program P1 is installed. The display control program P1 may be stored in a non-temporary computer-readable storage medium.

Also in the embodiment of the present disclosure, the display section is the touch panel 202. However, the present disclosure is not limited as such. For example, the display section may be a device such as virtual reality (VR) glasses or augmented reality (AR) glasses. In this case, non-voice input includes gestures by a hand and an arm of the user given to a camera which captures an image of the hand and the arm of the user.

What is claimed is:

1. A display control device comprising:
   a display section configured to display an object;
   a first receiving section configured to receive non-voice input specifying a first operation on the object;
   a second receiving section configured to receive voice input specifying a second operation on the object; and
   a performing section configured to perform, on the object, a complex operation specified by the non-voice input and the voice input, wherein
   the second receiving section includes:
      a recognizing section which performs speech recognition related to content of the second operation;
      a presenting section which presents a result of the speech recognition on the display section; and
      a correcting section which corrects the result of the speech recognition according to a correction instruction.

2. The display control device according to claim 1, wherein
   the display section includes a touch panel which displays the object, and
   the first receiving section receives the non-voice input of an operation in which a user selects a portion of the object on the touch panel with a finger as the first operation.

3. The display control device according to claim 1, wherein
   the second receiving section receives the voice input of an operation in which the object is enlarged and displayed on the display section as the second operation.

4. The display control device according to claim 1, wherein
   the second receiving section receives the voice input of an operation in which the object is rotated and displayed on the display section as the second operation.

5. A display control device comprising:
   a display section configured to display an object;
   a first receiving section configured to receive non-voice input specifying a first operation on the object;
   a second receiving section configured to receive voice input specifying a second operation on the object;
   a performing section configured to perform, on the object, a complex operation specified by the non-voice input and the voice input; and
   a determining section configured to determine a first range and a second range, the first range indicating a range of operation allowed to be specified as the first operation, the second range indicating a range of operation allowed to be specified as the second operation, wherein
   the first receiving section receives only non-voice input specifying an operation belonging to the first range, and
   the second receiving section receives only voice input specifying an operation belonging to the second range.

6. The display control device according to claim 5, wherein
   the determining section further has a function of determining which of the first receiving section and the second receiving section has priority for an operation belonging to both of the first range and the second range.

7. A display control device comprising:
   a display section configured to display an object;
   a first receiving section configured to receive non-voice input specifying a first operation on the object;
   a second receiving section configured to receive voice input specifying a second operation on the object, and
   a performing section configured to perform, on the object, a complex operation specified by the non-voice input and the voice input, wherein
   the object includes a first object and a second object which are different from each other,
   the first receiving section receives first non-voice input and second non-voice input, the first non-voice input specifying a third operation on the first object, the second non-voice input specifying a fourth operation on the second object,
   the second receiving section receives first voice input specifying a fifth operation on the first object and the second object, and
   the performing section performs a first complex operation on the first object and the second object, the first complex operation being specified by the first non-voice input, the second non-voice input, and the first voice input.

8. The display control device according to claim 7, further comprising
   an identifying section configured to display, on the display section, a first identifier for identifying the first object and a second identifier for identifying the second object.

9. The display control device according to claim 7, wherein
   the display section includes a touch panel which displays the first object and the second object, and
   the first receiving section receives the first non-voice input of an operation in which a user selects a portion of the first object on the touch panel with a finger as the third operation, and a second non-voice input of an operation in which the user selects a portion of the second object on the touch panel with a finger as the fourth operation.

10. The display control device according to claim 7, wherein
    the second receiving section receives the first voice input of an operation in which the first object and the second object are enlarged, aggregated, and displayed on the display section as the fifth operation.

11. The display control device according to claim 10, further comprising
    a prompting section configured to prompt the first non-voice input specifying the third operation and the second non-voice input specifying the fourth operation when the second receiving section receives the first voice input specifying the fifth operation before the first receiving section receives the first non-voice input and the second non-voice input.

* * * * *